April 16, 1929.  C. L. TICE  1,709,100
CURRENT METER
Filed April 20, 1928

Inventor
Clifford L. Tice
By Lancaster and Allwine
Attorneys

Patented Apr. 16, 1929.

1,709,100

UNITED STATES PATENT OFFICE.

CLIFFORD L. TICE, OF PENDLETON, OREGON.

CURRENT METER.

Application filed April 20, 1928. Serial No. 271,578.

The present invention relates to improvements in current meters for measuring velocities of water in various kinds of channels, and the primary object of the invention is to provide an improved type of current meter which will operate efficiently for measuring both small and high velocities of current flow.

A further object of the invention is to provide an improved current meter having a runner of novel construction whereby both the impulse and reaction of the water acts to rotate the runner and thus utilize the full extent of the force of the water.

A further object of the invention is to provide a current meter having a turbine type of runner having blades so shaped as to permit of the runner being turned under very low velocities of the water, and which blades are so arranged as to not form any constricted passageways for the water and thus allowing for the runner to operate for measuring high velocities of flow.

A further object of the invention is to provide an improved runner for current meters embodying novel features of construction whereby when the runner is submerged, the runner will have such buoyancy as to counterbalance the weight of the runner and thus permit of the runner to rotate with practically no friction, and thus allowing for the runner to turn under very low velocities.

A still further object of the invention is to provide an improved runner for current meters which is of such construction as to cause low resistance to stream flow, and having low cost of fabrication, uniformity of calibration, and close adherence to rating over a long period of time.

Other objects and advantages of the invention will be apparent during the course of the following detailed description, taken in connection with the accompanying drawing, forming a part of this specification and in which drawing.

Figure 1:
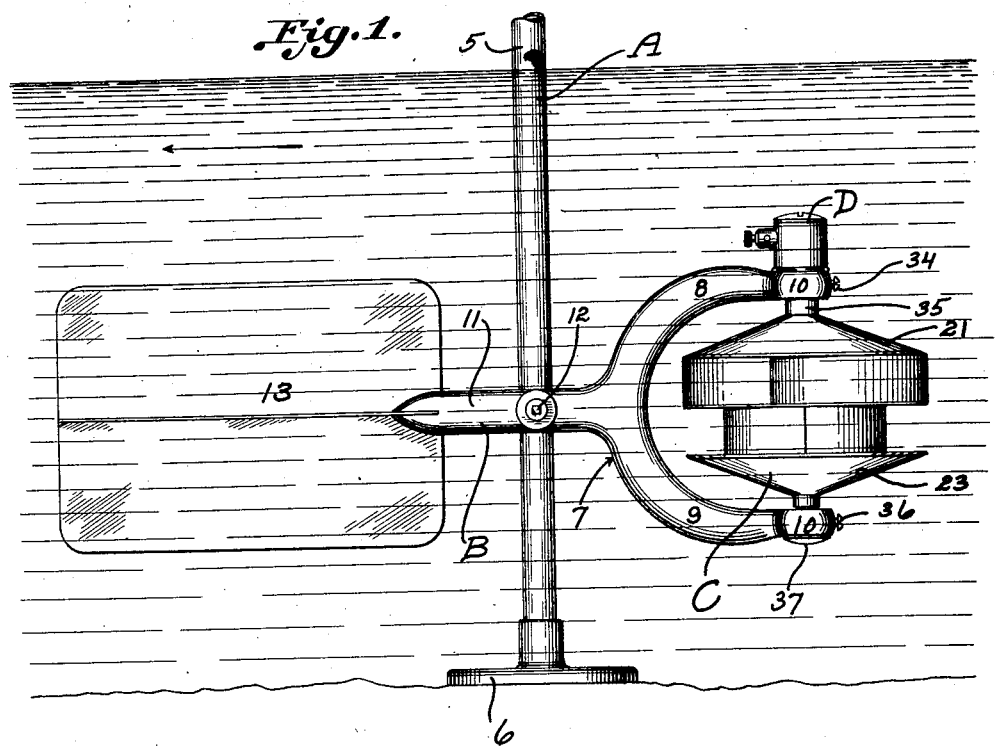
Figure 1 is a side elevation of the improved current meter and showing the manner in which the meter is submerged in the water.
Figure 2:
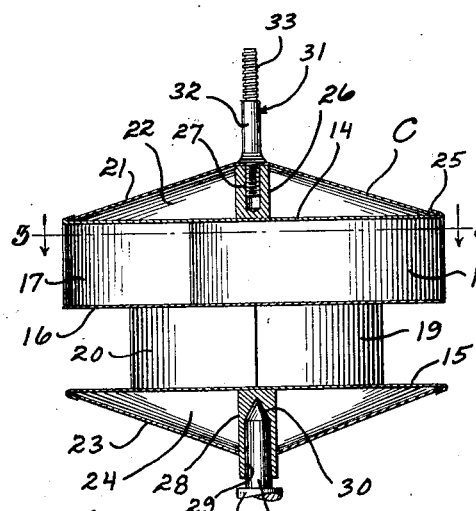
Figure 2 is an enlarged central vertical section thru the runner or revolving member for the meter.

Referring to the drawing in detail, and wherein similar reference characters designate corresponding parts thruout the several views, the letter A designates a support upon which is mounted a vertically adjustable carrier B upon which is mounted a runner C adapted to be revolved by the flow of current for operating suitable counting mechanism D.

The support A embodies a vertically mounted cylindrical shaft 5 which may be supported at its lower end in a suitable support 6 adapted to rest on the floor or bed of the channel in which the meter is to be mounted. In Figure 1, an arrow has been shown for indicating the direction of flow of water past the meter.

The carrier B embodies a U-shaped portion or yoke 7 forming upper and lower arms 8 and 9 respectively, provided at their free ends with tubular sleeve portions 10 arranged in spaced axial alignment one above the other. Projecting rearwardly from the central portion of the yoke 7 is a horizontally extending mounting or supporting stem 11 having a suitable transverse opening provided intermediate its ends for slidably receiving the cylindrical shaft 5. This carrier B is adjustable vertically on the shaft 5, and a set screw 12 may be provided for securing the carrier at various adjusted positions vertically on the shaft.

Secured at one end to the rear end of the horizontal stem 11 is a suitable tail or vane 13 which acts for retaining the yoke arms 8 and 9 extending in a direction opposite to the direction of current flow. The carrier B may either be held against rotation about the shaft 5 as by means of the set screw 12, and with which construction the tail or vane 13 will act in conjunction with the set screw for preventing rotation of the carrier after being properly set. If so desired, however, the carrier B may be mounted to revolve freely about the shaft 5 and with which construction the tail or vane 13 will act to retain the yoke arms 8 and 9 extending toward the direction of current flow.

Referring now to the specific construction of the novel runner C, the same embodies a series of spaced, superposed disc-shaped plates providing an upper or top plate 14, a lower or bottom plate 15, and a central plate or diaphragm 16. These spaced, superposed plates 14, 15 and 16 are preferably stamped from a suitable gauge of sheet metal and are arranged in axial alignment. Arranged between the top plate 14 and the central plate 16 is a pair of semi-cylindrical shaped blades 17 and 18 which are of identical formation and are secured thruout their edges to the plates 14 and 16 as by soldering or the like. Arranged between the bottom flat plate 15 and the central plate 16 is a second pair of semi-cylindrical shaped blades 19 and 20 which are of identical construction and which blades are secured thruout their edges to the respective plates 15 and 16 as by soldering or the like. As will be observed in Figure 3, the blades 17 and 18 are of like construction as that of the blades 19 and 20 and are spaced equally apart around the axis of rotation of the runner.

Secured at its circumferential edge to the upper side of the top disc or plate 14 is a conical-shaped cover plate 21 for providing an upper air chamber 22, while secured at its circumferential edge to the under side of the bottom plate 15 is a similar conical-shaped cover plate 23 providing a lower air chamber 24. These conical-shaped cover plates 21 and 23 are secured at their peripheral edges to the respective plates 14 and 15 as by turning the circumferential portions of the plates to form beads 25 which extend inwardly over the cover plates, and then soldering the joints to provide an air tight joint between the cover plates and discs. Arranged axially of the upper air chamber 22 is a hub member 26 having its inner end resting upon the upper disc 14 and provided with a threaded bore 27 which opens thru the apex of the conical-shaped cover plate 21. The apex portion of the cover plate 21 is soldered or otherwise secured to the upper end of the hub member 26 so that the chamber 22 will be rendered air tight. Extending axially thru the lower air chamber 24 with its upper or inner end abutting with the lower disc 15 and its outer or lower end projecting thru the lower cover plate 23 at the apex portion thereof, is a bearing member 28 having a bore 29 provided at its inner end with a conical-shaped seat 30. This bore 29 extends coaxial with the threaded bore of the hub member 26. The bearing member 28 is secured to the apex portion of the cover plate 23 in any suitable manner for rendering the lower compartment 24 air tight.

Threaded at its lower end into the upwardly opening threaded bore 27 of the hub member 26 is a drive shaft 31 having a bearing portion 32 and provided at its upper end with a threaded portion 33 forming a worm adapted to extend upwardly into the housing of the counting device D for actuating the counting mechanism.

Secured in position within the sleeve portion of the upper yoke arm 8 as by a set screw 34 is a tubular sleeve or bushing 35 thru which the drive shaft 31 extends with the bearing portion 32 of the shaft having a bearing in the bore thru the sleeve. The lower end of the bushing 35 is adjustable into light bearing contact with the enlarged lower end of the shaft bearing portion 32 and thus acts as a means for preventing upward movement of the runner when mounted between the arms of the yoke 7. Mounted in the sleeve portion 10 of the lower yoke arm 9 as by means of a set screw 36 is a plug 37 having a spindle portion 38 adapted to extend upwardly into the bore of the bearing member 28 to form a seat bearing for the runner C. The upper end of the spindle portion 38 is of conical shape and is intended to have bearing engagement with the conical seat 30 of the bearing member 28. Thus it will be seen that the shaft 31 and spindle 38 serve as means for rotatably mounting the runner C between the arms of the yoke 7.

Referring now to the specific and novel manner in which the companionally acting upper and lower sets of blades are arranged between the superposed plates so that both the impulse and reaction of the water tends to revolve the runner; these semi-cylindrical shaped blades 17 to 20 inclusive are of a diamter greater than the radius of the disc-shaped plates 14, 15 and 16, with the radius of the blades equal to one-third the diameter of the plates. As will be observed in Figure 3, the upper set of blades 17 and 18, and which are disposed between the discs 14 and 16, are arranged in opposed relation at opposite sides of the diametric center of the plates with the chords or open sides of the semi-cylindrical blades aligning diametrically of the plates. The outer end 40 of each of the blades extend to the peripheral edge of the plates, while the inner end 42 of each blade terminates at a point midway between the inner and outer ends of its companion blade and at a point forming the axis of the blades. With this arrangement of the blades it will be seen that a substantially S-shaped passageway is formed between the plates 14 and 16 with the openings 44 at the ends of the passageway opening in diametrically opposite directions. By so having the blades of a radius equal to one-third the diameter of the plates 14 and 16 so that the inner end 42 of one blade terminates at a point forming the axis of the companion blade, it will be seen that the distance between the inner ends of the blades is equal to the width of the openings 44 and that the S-shaped passageway formed by the blades has no restricted portion tending to decrease the passage of water thru the passageway. By observing Figure 3 it will readily be seen the manner in which both the impulse and reaction of the water will act to revolve the runner. The water passing the runner in the direction of the arrow in Figure 3 will act on the inner arcuate surface of the blade 18 and then be directed rearwardly between the inner ends 42 of the blades so as to react upon the inner arcuate surface of the blade 17 at the opposite side of the axis of rotation of the runner from which the impulse of the water acts upon the blade 18.

Figure 3:
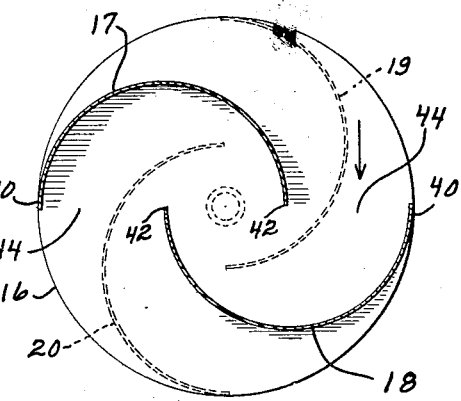
Figure 3 is a horizontal section on line 3—3 of Figure 2.

As will also be observed in Figure 3, the lower set of blades 19 and 20, shown in dotted lines, are arranged in opposed relation at opposite sides of a line extending diametrically of the plates at a right angle to the diametric center line along which the chord or open sides of the blades 17 and 18 extend. These blades 19 and 20 are arranged in a like manner as that of the blades 17 and 18 for forming a substantially S-shaped passageway between the plates 15 and 16, with the passageway extending across the runner in a general direction at a right angle to the passageway formed by the upper set of blades 17 and 18. Thus it will be seen that the semi-circular shaped blades are spaced equally around the axis of rotation of the runner and that the water will alternately act first upon one of the upper sets of blades and then upon one of the lower sets of blades so that the runner will be rotated with an even and uniform speed.

Figure 4:
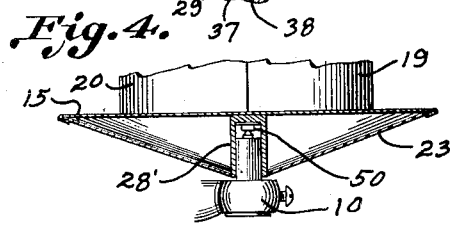
Figure 4 is a fragmentary vertical section showing a slightly modified form of lower or step bearing for the runner.

Referring now to the slightly modified form of lower bearing for the runner as shown in Figure 4, the bearing member 28' has been shown provided with a jeweled bearing 50 for forming a practically frictionless bearing for the lower end of the runner.

In using the improved current meter for measuring velocities of water in various kinds of channels, the runner is fully submerged so that its axis of rotation extends in a vertical direction as shown in Figure 1. When the runner is submerged, the air chambers 22 and 24 will act as buoying chambers for counter-balancing practically all of the weight of the runner and thus cause the runner to rotate with practically no friction. This buoying up of the runner, together with the specific shape and arrangement of the blades 17 to 20 inclusive will cause the runner to revolve in water having a very small velocity. Owing to the conical shaped ends of the runner, the ends will have little or no resistance to the passage of water past the runner, and since there are no restricted ways in the water passageways thru the runner, such forms a very low resistance to stream flow and thus renders the runner an efficient and reliable device for measuring high velocities of stream flow. Since the runner will operate with practically no friction owing to the buoyancy of the air chambers, and owing to the fact that both the impulse and reaction of the water tends to revolve the runner, it will be seen that the runner will be extremely sensitive to a stream flow of small velocity.

The design of the runner is such that, with exception of the bearings, the same can be stamped out of sheet metal and assembled in a suitable jig for soldering the parts together, thus allowing for low cost of fabrication, and, owing to the simple shape of the parts, makes for extreme uniformity in calibration and close adherence to rating over a long period of time.

From the foregoing description it will be apparent that a novel and improved construction for current meters has been provided embodying a runner of novel construction whereby both the impulse and reaction of the water tends to rotate the runner, and which runner is of such configuration as to permit of the runner being rotated under small velocities of current flow. It will also be apparent that a novelly constructed runner has been provided wherein the weight of the runner is counter-balanced in such a manner as to allow for the runner to operate with practically no friction when in use in the water.

Changes in detail may be made to the forms of invention herein shown and described, without departing from the spirit of the invention or the scope of the following claims.

I claim:

1. A current meter comprising a supporting standard, a carrier vertically adjustable on the standard and including a pair of supporting arms, a runner revolubly mounted between said arms, and means for registering the revolutions of the runner.

2. A current meter comprising a supporting standard, a carrier vertically adjustable on the standard and having a yoke forming a pair of supporting arms, a runner revolubly mounted between said arms and having a shaft revoluble therewith, and means carried by the yoke and operable by the shaft for registering the revolutions of the runner.

3. A current meter comprising a supporting standard, a carrier mounted on the standard and including a yoke portion forming a pair of supporting arms, a runner revolubly mounted between said arms and having means for counter-balancing the weight of the runner when submerged below the water level, and means for registering the revolutions of the runner.

4. A current meter comprising a supporting standard, a carrier embodying a mounting stem adjustable on the supporting standard and a yoke portion forming a pair of superposed supporting arms, a vane carried by the opposite end of the mounting stem from which the yoke is formed, a runner revolubly mounted to rotate about a vertical axis between said supporting arms, and a counting device carried by the uppermost arm for registering the revolutions of the runner.

5. A current meter comprising a supporting standard, a carrier mounted on the standard including a yoke forming upper and lower supporting arms, a runner mounted to revolve about a vertical axis between said arms, buoying means for the runner, and means for registering the revolutions of the runner.

6. A current meter comprising a supporting standard, a carrier mounted on the standard including a yoke forming a pair of supporting arms, a runner revolubly mounted between said arms and provided with buoying chambers acting as a weight counterbalancing means for the runner, and means for registering the revolutions of the runner.

7. A current meter comprising a supporting standard, a carrier vertically adjustable on the standard and including a pair of upper and lower supporting arms, a runner revolubly mounted between said arms to rotate about a vertical axis, said runner being provided with buoying chambers, and a counting mechanism carried by the uppermost arm and operable upon rotation of the runner.

8. In a current meter, a carrier including a pair of horizontally disposed arms arranged one above the other, a spindle mounted in the lower arm, a runner revolubly mounted at its lower end upon the spindle and having a drive shaft at its upper end rotatable in the upper arm of the carrier, buoying means for the runner, and a counting device mounted above the uppermost carrier arm and operable by the drive shaft.

9. In a current meter, a carrier embodying upper and lower supporting arms, and a runner revolubly mounted between said arms having conical-shaped upper and lower ends forming buoying chambers, and propeller blades arranged between the buoying chambers.

10. In a current meter, a carrier embodying a pair of upper and lower supporting arms, a runner for rotatable mounting between said arms including upper and lower buoying chambers having conical-shaped cover plates, and a series of propelling blades arranged between the buoying chambers, said runner at its upper end having a drive shaft extending thru the upper supporting arms of the carrier, and a counting device mounted upon the upper most carrier arm for operation by said drive shaft.

11. In a current meter, a runner having conical-shaped ends, means for rotatably mounting the runner at the apex portions of its ends, and a series of propeller blades arranged between the conical-shaped ends and spaced equally about the axis of rotation of the runner.

12. In a current meter, a runner having a hollow air tight conical-shaped head at each end thereof, means for rotatably mounting the runner at the apex portions of the heads, and a series of semi-cylindrical shaped blades arranged between the heads and spaced equally about the axis of rotation of the runner.

13. In a current meter, a runner having a hollow conical-shaped head formed at each end thereof providing air tight chambers, means for rotatably mounting the runner at the axes of the heads, and a series of propeller blades arranged between the heads and serving as a connecting means for the heads.

14. In a current meter, a runner comprising a series of superposed plates, a cover plate connected with each end plate and forming therewith an air chamber at each end of the runner, bearing-forming means at each end of the runner, and propeller blades arranged between the adjacent superposed plates with the blades arranged between one set of plates offset circumferentially with respect to the blades arranged between one of said plates and the next adjacent plate, said blades serving as a connecting means between the superposed plates.

15. In a runner for current meters, a series of three superposed disc-shaped plates, and a pair of semi-cylindrical shaped blades arranged between and connecting adjacent plates for forming S-shaped passageways traversing the axis of rotation of the runner, with the passageway of one set of blades traversing the axis of the runner in angular relation to that of the companion set of blades.

16. In a runner for current meters, the combination of a series of superposed discs, and a pair of semi-cylindrical shaped blades arranged in opposed relation betwen each adjacent pairs of plates at opposite sides of the diametric center of the plates with the open sides of the blades aligning diametrically of the plates and with each set of blades having the aligning cords of their open sides extending diametrically of the plates at an angle to the aligning cords of the companion sets of blades.

17. In a runner for current meters, a series of three superposed discs providing an upper disc, a central disc, and a lower disc, a pair of semi-cylindrical shaped blades arranged between the upper and medial discs and arranged in opposed relation at opposite sides of the diametric center of the disc to provide a reverse passageway extending between the upper and medial disc, and a second set of semi-cylindrical shaped blades arranged between the medial and lower disc and arranged in opposed relation at opposite sides of a line extending diametrically of the plates at a right angle to the diametric center line for the upper sets of blades and providing a reverse passageway between the medial and lower disc traversing the axis of rotation of the runner at a right angle to the direction in which the upper passageway traverses the axis of rotation of the runner.

18. In a runner for current meters, a series of three superposed discs providing an upper disc, a central disc and a lower disc, a conical-shaped cover plate connected with the upper disc and forming therewith an air chamber, a conical-shaped cover plate connected to the lower disc and forming therewith an air compartment, bearing-forming means for the upper and lower ends of the runner, and a pair of semi-cylindrical shaped blades arranged between the upper and central disc and another pair between the central and lower discs, said blades having radii equal to one-third the diameter of the plates, with each set of blades arranged to provide an S-shaped passageway traversing the axis of rotation of the runner and with one of said passageways traversing the runner at substantially a right angle to the companion passageway.

CLIFFORD L. TICE.